US012672052B2

(12) United States Patent　(10) Patent No.:　US 12,672,052 B2

Niu et al.　(45) Date of Patent:　Jun. 30, 2026

(54) METHOD, DEVICE, AND SYSTEM FOR CELL ACCESS IN WIRELESS NETWORKS

(71) Applicant: ZTE Corporation, Shenzhen (CN)

(72) Inventors: Li Niu, Shenzhen (CN); Bo Dai, Shenzhen (CN); Xiubin Sha, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 375 days.

(21) Appl. No.: 18/476,713

(22) Filed: Sep. 28, 2023

(65) Prior Publication Data

US 2024/0023011 A1　Jan. 18, 2024

Related U.S. Application Data

(63) Continuation of application No. PCT/CN2021/085313, filed on Apr. 2, 2021.

(51) Int. Cl.
H04W 48/16　(2009.01)
H04W 24/08　(2009.01)
H04W 76/27　(2018.01)

(52) U.S. Cl.
CPC ........... H04W 48/16 (2013.01); H04W 24/08 (2013.01); H04W 76/27 (2018.02)

(58) Field of Classification Search
CPC ..... H04W 48/16; H04W 24/08; H04W 76/27; H04W 76/28; H04W 16/18; H04W 52/0245; H04W 76/10; H04W 48/02; H04W 48/20; H04W 52/0248; H04W 52/223; H04W 52/26; H04W 52/0229; Y02D 30/70
See application file for complete search history.

(56) References Cited

U.S. PATENT DOCUMENTS

| | | | |
|---|---|---|---|
| 6,157,896 A | 12/2000 | Castles et al. | |
| 2013/0196650 A1 | 8/2013 | Futaki | |
| 2019/0190582 A1 | 6/2019 | Guo et al. | |
| 2021/0092781 A1 * | 3/2021 | Lauridsen | H04W 24/02 |
| 2021/0105853 A1 * | 4/2021 | Kang | H04W 76/27 |

FOREIGN PATENT DOCUMENTS

| | | |
|---|---|---|
| WO | WO 2014/162061 A1 | 10/2014 |
| WO | WO 2018/112502 A1 | 6/2018 |

OTHER PUBLICATIONS

Extended European Search Report issued in European Patent Application No. 21934083.3 dated Oct. 1, 2024, 12 pages.
International Search Report in International Application No. PCT/CN2021/085313 dated Jan. 6, 2022, 3 pages.
Office Action issued in Mexican Application No. MX/a/2023/011411 dated Jan. 27, 2026 with English translation (10 pages).

* cited by examiner

*Primary Examiner* — Said M Elnoubi
(74) *Attorney, Agent, or Firm* — Crowell & Moring LLP

(57)　ABSTRACT

This disclosure relates generally to cell coverage, cell search, cell access, cell selection, and cell measurement in wireless networks. Performed by a User Equipment (UE) in a wireless network, the method including determining a cell coverage information associated with a search limitation of the UE. In this disclosure, various embodiments are disclosed to facilitate the UE to: detect cell coverage condition; handle certain cell coverage condition; and stop or relax certain UE activities during certain cell coverage condition.

20 Claims, 5 Drawing Sheets

METHOD, DEVICE, AND SYSTEM FOR CELL ACCESS IN WIRELESS NETWORKS

CROSS-REFERENCE TO RELATED APPLICATION

This application is a continuation application of PCT International Patent Application No. PCT/CN2021/085313, filed with the China National Intellectual Property Administration, PRC on Apr. 2, 2021, which is herein incorporated by reference in its entirety.

TECHNICAL FIELD

This disclosure is directed generally to wireless communications, and particularly to methods, systems and devices for cell coverage, cell search, cell access, cell selection, and cell measurement.

BACKGROUND

A wireless network supports both terrestrial deployments and non-terrestrial deployments. In both deployments, it is critical for a User Equipment (UE) to reduce power consumption yet still meet service requirement.

SUMMARY

This disclosure is directed to methods, systems and devices for cell measurement, cell selection, and cell re-selection in wireless communication networks.

In one embodiment, a method performed by a User Equipment (UE) in a wireless network is disclosed. The method may include determining a cell coverage information associated with a search limitation of the UE.

In some embodiments, there is a wireless communication terminal and/or a core network node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Certain features are described using the example of non-terrestrial network. However, applicability of the disclosed techniques is not limited to only non-terrestrial network, and the disclosed implementations are applicable to any wireless systems. Section headings are used in the present disclosure only to improve readability and do not limit the scope of the disclosed embodiments and techniques in each section to only that section.

In this disclosure, various embodiments and solutions, in whole or in partial, may be used in a combination.

Wireless Communication Network

Figure 1:
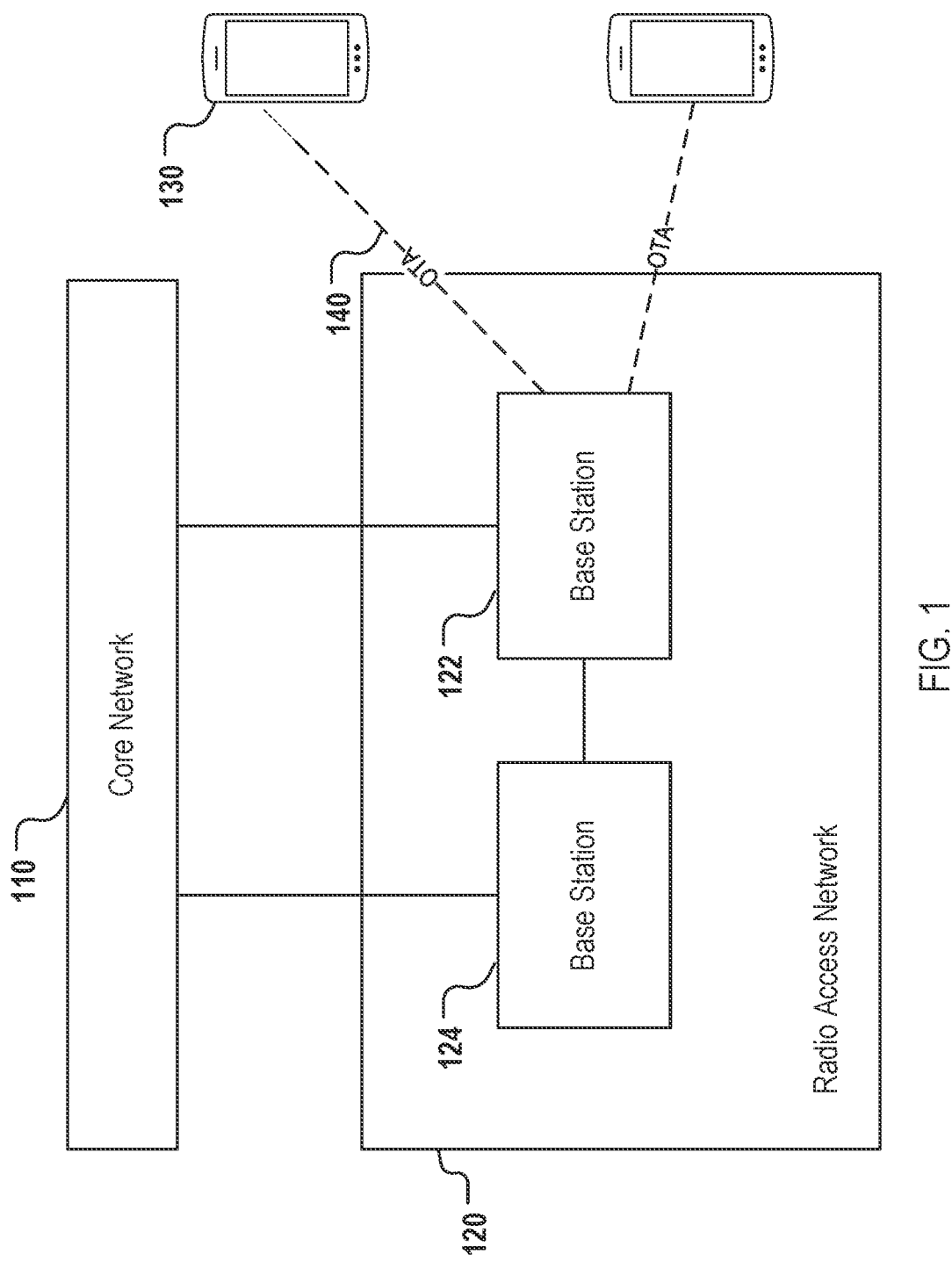
FIG. 1 shows an example wireless communication network.

FIG. 1 shows an example cellular wireless communication network 100 (also referred to as wireless communication system) that includes a core network 110 and a radio access network (RAN) 120. The RAN 120 further includes multiple base stations 122 and 124. The base station 122 and user equipment (UE) 130 communicate with one another via Over the Air (OTA) radio communication resources 140. The wireless communication network 100 may be implemented as, as for example, a 2G, 3G, 4G/LTE, or 5G cellular communication network. Correspondingly, the base stations 122 and 124 may be implemented as a 2G base station, a 3G nodeB, an LTE eNB, or a 5G New Radio (NR) gNB. The UE 130 may be implemented as mobile or fixed communication devices installed with SIM/USIM modules for accessing the wireless communication network 100. The UE 130 may include but is not limited to mobile phones, Internet of Things (IoT) devices, Machine-type communications (MTC) devices, laptop computers, tablets, personal digital assistants, wearable devices, distributed remote sensor devices, roadside assistant equipment, and desktop computers. Alternative to the context of cellular wireless network, the RAN 120 and the principles described below may be implemented as other types of radio access networks, such as Wi-Fi, Bluetooth, ZigBee, and WiMax networks.

In the example wireless communication system 100 of FIG. 1 the UE 130 may connect with and establish a communication session with the base station 122 via the OTA interface 140. The communication session between the UE 130 and the base station 122 may utilize downlink (DL) and/or uplink (UL) transmission resources. The DL transmission resource carries data from the base station 122 to the UE 130, and the UL transmission resource carries data from the UE 130 to the base station 122.

The wireless system supports both terrestrial network (TN) deployments and non-terrestrial network (NTN) deployments. For example, TN deployments may be used to serve populous area and NTN deployments may be used to serve sparsely populated area.

Non-Terrestrial Network

In certain areas such as mountains, deserts, oceans, etc., wireless communication network deployments may be expensive. However, with the advancement of science and technology, there is a great demand of data collections and communicate in these remote regions. For example, there may be a need to collect meteorological data at a mountain peak or desert.

Figure 2:
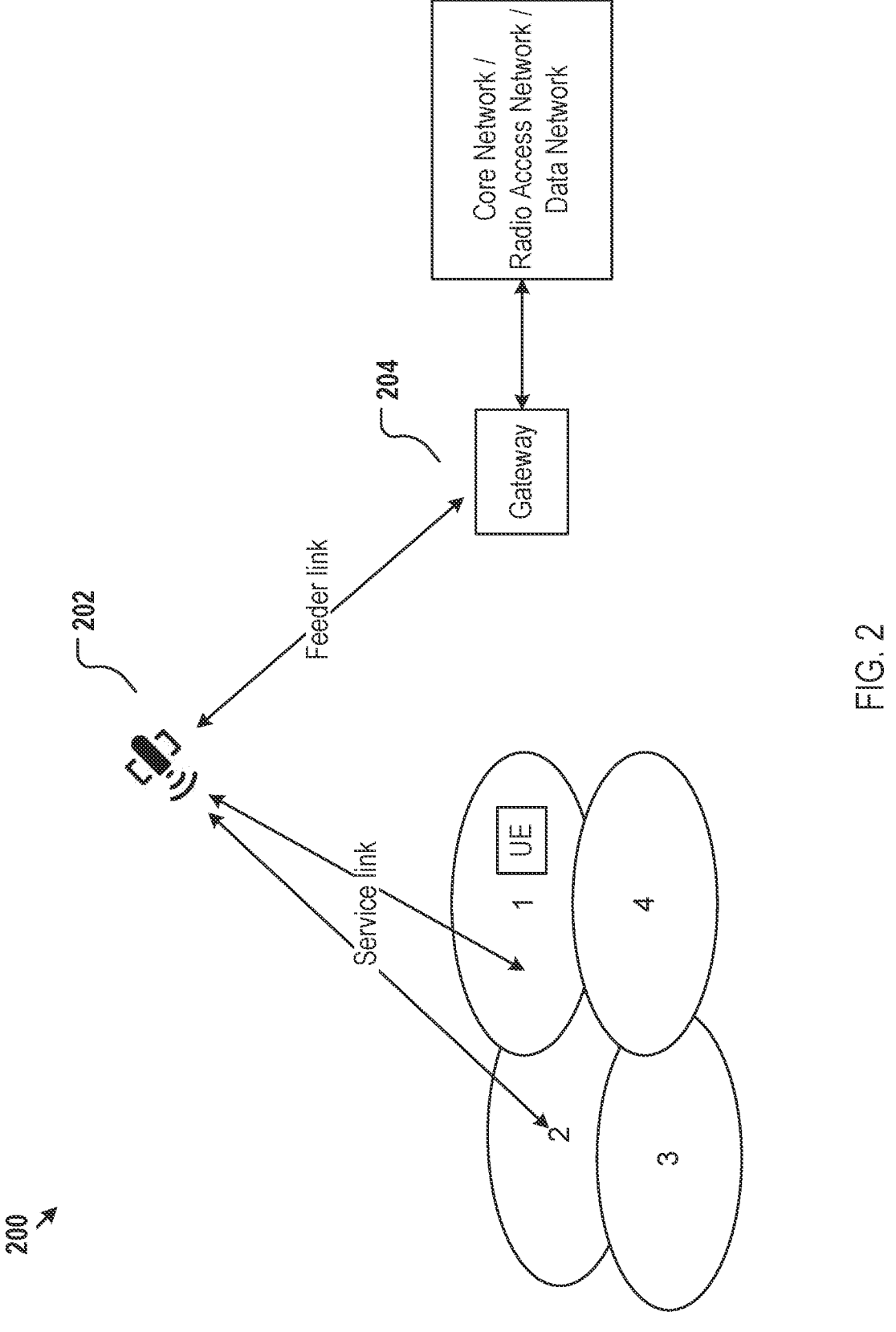
FIG. 2 shows an example non-terrestrial deployment of a wireless network.

In non-terrestrial network (NTN) deployments, a satellite may provide signal coverage to a large area even in the remote regions. The non-terrestrial network may be deployed in addition to a terrestrial network, thereby further extending coverage of, for example a terrestrial cellular network. The satellite may be associated with a base station, or be part of (or as an extension of) the base station. FIG. 2 shows an example non-terrestrial network 200 that provides wireless network access to a UE. In the non-terrestrial network 200, a satellite 202 provides communication links between the ground areas. Similar to a traditional cellular network, the covered ground areas may be divided into cells, or more specifically, satellite cells, such as cells 1 to 4 as shown in FIG. 2. These cells may provide signal coverage for the UE. A radio link between satellite and UE may be referred to as a service link. The satellite 202 may generate several beams over a given service area bounded by its field of view. The footprints of the beams may be of elliptic shapes.

An NTN may include an NTN gateway 204 which may be an earth station located at the surface of earth, and providing sufficient RF power and RF sensitivity for accessing the satellite 202. The NTN Gateway 204 may be a transport network layer (TNL) node and may provide access to, for example, a core network, a radio access network, or a data network. The wireless link between the NTN Gateway 204 and satellite 202 may be referred to as a feeder link.

The satellite may be placed into Low-Earth Orbit (LEO), or Geostationary Earth Orbit (GEO). The geostationary Earth orbit may be a circular orbit at 35,786 km (kilometer) above the earth's equator and following the direction of the Earth's rotation. A GEO satellite in such an orbit may have an orbital period equal to the Earth's rotational period and thus appears motionless, at a fixed position in the sky, to ground observers. The typical beam footprint size of the GEO is about 200-3500 km. The low Earth Orbit may be an orbit around the earth with an altitude between 300 km to 1500 km. A LEO satellite in such an orbit encircle around the earth with the speed of, for example, 7.56 km per second. The beam footprint size of LEO may be 50 km to 1000 km.

Coverage Hole

As described in the above section, in an NTN deployment, a cell coverage is provided by satellite(s). In certain scenarios, for example, when the satellite is LEO satellite, the satellite is moving. The satellite may only provide coverage to a certain area for a period of time. To provide continuous cell coverage to an area, the next satellite needs to start providing service at least before the current satellite exits the area. However, in some deployment, the number of satellites are limited and there may be a service interruption to an area, causing a coverage hole.

Figure 3:
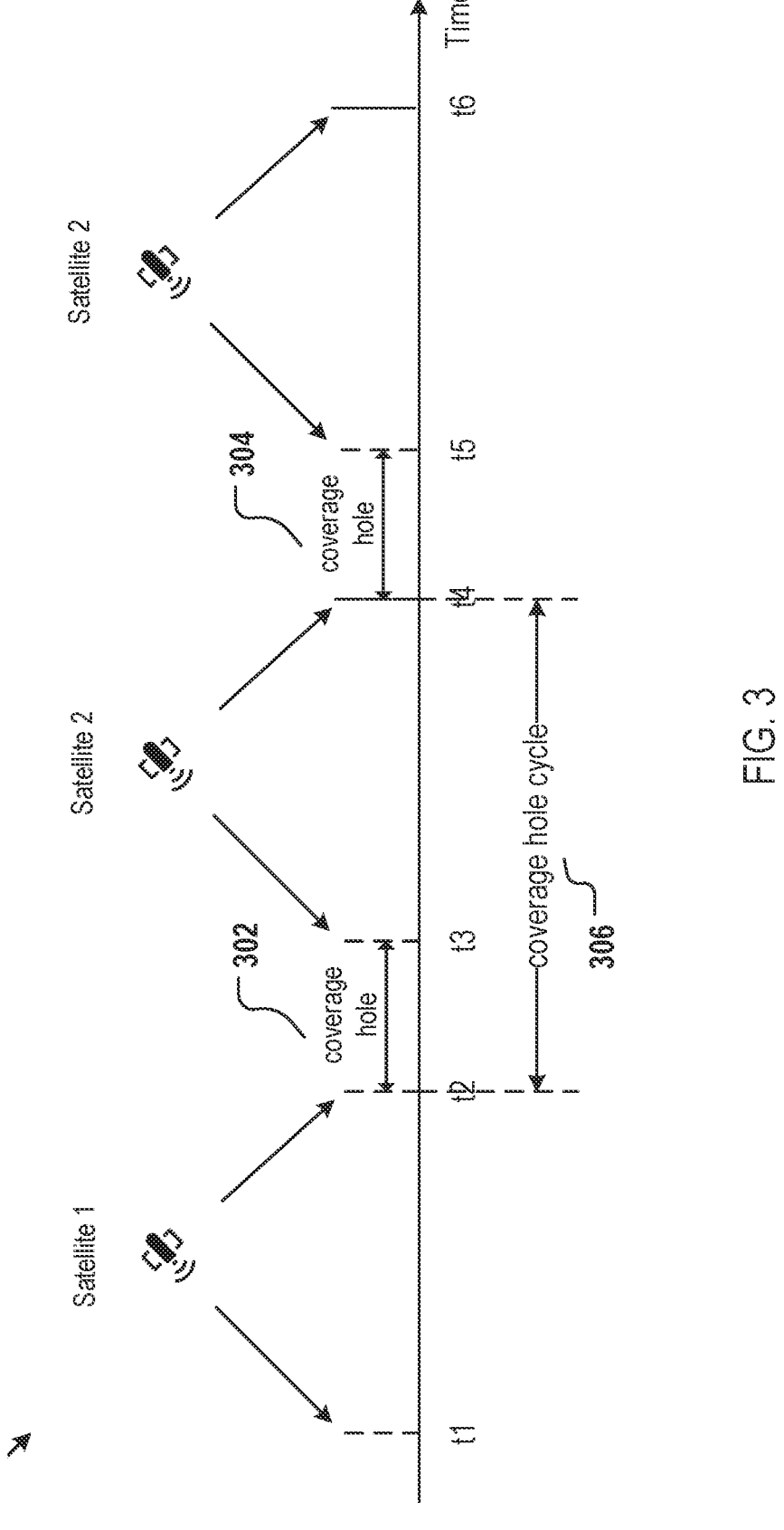
FIG. 3 shows an example cell coverage condition featuring a coverage hole.

Referring to FIG. 3, from t1 to t2, satellite 1 provides services to an area. Satellite 1 exits the area at time t2. Satellite is the next satellite serving the area and starts to serve the area at time t3. As shown in FIG. 3, between time t2 to t3, there is no cell coverage for the area. This scenario may be referred to as a coverage hole. In FIG. 3, there are two coverage holes: 302 and 304. A coverage hole may have certain characteristics. For example, it may have a start time t2, an end time t3. The coverage hole may also have a duration, such as the duration from t2 to t3. The coverage hole may further have a periodicity (or cycle) 306. As will be described in sections below, these characteristics may be used for predicting a coming coverage hole.

In this disclosure, the NTN deployment is merely used for exemplary purpose. The concept of coverage hole may be generally applied to similar scenarios without limitation. For example, if a base station is experiencing trouble and there is no other coverage to a specific area, the area may experience a coverage hole condition.

In this disclosure, the term "coverage hole" is generally used to refer to the coverage condition. As more details will be given is sections below, the coverage hole may also be referred to as a "mute state", a "silent state", as it may be beneficial (e.g., power saving) for a UE to stay silent when the UE is in a coverage hole. The coverage hole may also be referred to as an "access barring state" or "access prohibit state", as a UE may be barred from cell access activities when the UE is in a coverage hole.

Cell Coverage

The cell coverage condition for a UE may change from time to time, and various factors may contribute to the change. For example, the coverage hole may impact the cell coverage. It may be beneficial for the UE to know about its cell coverage information, either in real time, or in a predicted manner. If the UE knows there is no cell coverage, or there is limited coverage, or the quality of cell coverage is below a desired threshold, the UE may limit or even stop some of its activities to save its power consumption. These activities may include cell search, cell measurement, cell selection/reselection, PLMN selection, or the like. These activities may further include UE network access activity. The UE may resume these activities once the cell coverage condition changes, for example, to a desired level. The cell coverage condition such as a coverage hole may last for a period and the UE may adjust its behavior accordingly in such a period. As the UE limits its activities in this period, such period may also be generally referred to as a limitation period (or, search limitation period, measurement limitation period, cell selection limitation period, etc.)

The UE may determine the cell coverage information by itself, or may coordinate with the base station and/or the core network to determine the cell coverage information. For example, the base station may send the cell coverage information to the UE; or the UE may determine the cell coverage information based on signal quality. In some embodiments, the cell coverage information may include at least one of:

a duration of a certain coverage condition (e.g., a coverage hole);

a start time of a certain coverage condition;

an end time of a certain coverage condition;

whether of a certain coverage condition being presenting; or a periodicity of the coverage condition.

Furthermore, the cell coverage information may imply a limitation on UE activities. The cell coverage information may be indicative of:

a duration of the limitation;

a start time of the limitation;

an end time of the limitation; or whether a limitation being presenting; or a periodicity of the limitation.

In this disclosure, various embodiments are disclosed using coverage hole for exemplary purpose. The same or similar underlying principle applies to cell coverage in general.

In some embodiments of this disclosure, the frequency of certain UE activities may be reduced (or relaxed) in the limitation period.

Embodiment 1

When in idle or inactive mode, the UE performs cell search (including cell selection and cell reselection) and Public Land Mobile Network (PLMN) search. After the UE find an available PLMN that the UE may use, it reports the search result to the Non Access Stratus (NAS) layer of the UE, and the NAS layer is responsible for PLMN selection. However, when the UE is in a coverage hole, due to no coverage, the UE may not search for a cell, nor may it search for a PLMN. After the UE intensively searches for the PLMN and fails, the NAS layer will notify the AS layer of the UE to stop the PLMN search. The AS layer stops the PLMN search until the NAS layer informs the AS layer to start the PLMN search again.

In the case of coverage holes, it is useless for the UE to search for cells, and it is also unacceptable especially for UEs that are sensitive to power consumption. Therefore, in the presence of coverage holes, it is beneficial for the UE to reduce or even stop cell search and PLMN search. In doing so, the UE needs to be able to identify a coverage hole condition and makes decision on cell search and PLMN search based on the coverage hole condition.

In this disclosure, various embodiments are described for detecting the coverage hole condition.

In this disclosure, a network includes a base station, may send a Radio Resource Control (RRC) message or a System Information (SI) message carrying various information to the UE.

In this disclosure, a core network may communication with the UE through Non Access Stratum (NAS) message.

Solution 1

The UE may use ephemeris information to calculate potential coverage hole. The ephemeris information may include the trajectory of the satellite providing service to the UE, or the trajectory of the cell (e.g., serving cell and/or neighbor cell of the UE). Through the ephemeris information, the UE may derive the time when the serving cell or the serving satellite stops providing coverage to the UE, as well as the time when the next cell or satellite starts providing coverage to the UE. If there is a discontinuity between these two times, then the UE may infer that there will be a coverage hole in the area, or that the UE will enter a mute/silent period, or the UE's access activity is barred or forbidden. The UE may also derive the start time, the end time, the duration, and the periodicity of coverage hole.

Solution 2

The UE may calculate possible coverage hole through network instructions. For example, the base station or the core network may indicate the coverage hole start time, the coverage hole end time, the coverage hole duration, the start time when a next cell or a next satellite starts to serve the UE, the periodicity of the coverage hole, etc. These times may be absolute times, or relative times relative to the time when the UE receives the indication message, or may be a time ranges. As described earlier, the base station may send the indication using an RRC or SI message, and the core network may send the indication using a NAS message.

Solution 3

The UE may determine whether there is a coverage hole based on the condition of a received signal quality. For example, the base station indicates a first signal quality threshold and a second signal quality threshold to the UE. If within a predetermined duration, the signal reception quality of the UE is consistently below the first signal quality threshold, the UE may determine it enters a coverage hole. If within a predetermined duration, the signal reception quality of the UE is consistently above the second signal quality threshold, the UE may determine it exits a coverage hole. The first signal quality threshold and the second signal quality threshold may or may not be the same and the predetermined duration may be configured by the network.

In some embodiments, the measurement may be based on a serving cell of the UE, or other cells. The UE may also determine it exits the coverage hole if at least one of the following condition applies:

a cell meeting an acceptable cell criterion;

a cell meeting a suitable cell criterion; or a cell meeting a camp cell criterion.

Solution 4

The UE stops or relaxes search or measurement based on an indication/instruction from the network. The term "relax" means the search frequency or the measurement frequency is reduced.

The UE may be indicated by the core network or the base station that network access is not allowed (i.e., access is barred) and/or the UE is in a coverage hole. The core network may use a dedicated message (e.g., a NAS message) to send the indication. Or the base station may use an RRC message or a System Information to carry access control information or a prohibited access indication.

The information sent by the core network or the base station may also include a start time, or a duration for the coverage hole. The information may further include a list of forbidden resources which may be a PLMN list, a cell list, a frequency list, or the whole network. After receiving the information, the UE considers the associated forbidden resources to be inaccessible from the start time of the coverage hole, for the duration of the coverage hole, or until the end of the coverage hole.

When the UE is in a coverage hole, the UE may stop or relax the search for PLMN, stop or relax the search for cells, or stop or postpone the initiation of services with the network.

In the aforementioned solutions, on the UE side, if the RRC layer of the UE determines a coverage hole condition presents, the RRC layer reports the condition to the NAS layer of the UE. The coverage hole condition may also include the start time, the end time, or the duration of the coverage hole. Based on this information, NAS layer of the UE instructs RRC layer of the UE to stop/relax cell search and PLMN search during the coverage hole. At the end of the coverage hole, the NAS layer may instruct the RRC layer to start or resume cell search and PLMN search.

Embodiment 2

In a connected state, the UE accesses a cell and obtains cell services, for example, via a satellite. If the next satellite cannot cover the area where the UE is located on time, a coverage hole may occur. Once the base station (or core network) determines that there will be a coverage hole for the UE, for example, through the ephemeris information or network configuration, the base station may release the UE connection through an RRC message (e.g., RRCConnectionRelease, RRCEarlyDataComplete). After the UE receives the message, it may release all its connections with the network, delete the UE context, and enter an idle state. In the idle state, once the UE finds a candidate cell, the UE may establish a connection with the candidate cell. In particular, the candidate cell that the UE accesses may be the same cell as the last serving cell, or both cells belong to the same base station, which means that the base station may save the UE context and keep the UE connection with the core network in the base station, so the UE connection may be restored quickly. However, on the UE side, the UE still needs to release and re-establish its connection, which leads to a relatively long time delay.

In this embodiment, the base station may instruct the UE to enter an RRC idle with suspended RRC connection or an RRC inactive state. After the UE transitions to the RRC idle with suspended RRC connection or the RRC inactive state, the UE saves its UE context, suspends all Signaling Radio Bearers (SRBs) and Data Radio Bearers (DRBs), and performs cell reselection. However, if the UE is about to enter or has entered a coverage hole, performing cell reselection is useless and also waste energy. This is unacceptable for some UEs, especially for UEs that are sensitive to power consumption. In order to prevent the UE from performing useless search, the UE may be prohibited from reselecting cell if the UE is in a coverage hole. Various solutions are described below.

Solution 1

The base station may send a message (e.g., SI, RRCConnectionRelease, RRCEarlyDataComplete, etc.) to instruct the UE to enter the RRC idle with suspended RRC connection or the RRC inactive state. The message may also include coverage hole information. The coverage hole information may include a coverage hole start time, a coverage hole end time, or a coverage hole duration. The detail for determining the coverage hole information are described in embodiment 1 and is not described herein again. When the UE determines that the UE enters a coverage hole, the UE may start a timer 1. For example, the duration of timer 1 may be set to the coverage hole duration, or the expiry of timer 1 may be determined by the coverage hole end time.

After receiving the message, the UE first performs the operation of leaving the RRC connected state, or entering an inactive or idle state, and then performs the operation for handling coverage hole. Specifically, to handle the coverage hole, the UE performs at least one of: the UE may start timer 1; save the UE context; suspend all SRBs and DRBs; or suspend other running timers. The UE may further stop or relax cell search or PLMN search. The UE may also stop or relax downlink signal monitoring and measurement, and either stop or postpone the initiation of services. Until the timer 1 expires, or the UE leaves the coverage hole, the UE resumes other timers, starts cell search or PLMN search, and may also initiate services if needed.

Alternatively, after receiving the message, the UE first performs the operation for handling coverage hole, which is similar as described above and including at least one of: staring timer 1, or suspend other running timers. Then once timer 1 expires, or the UE leaves the coverage hole, the UE resumes other timers, performs the operation of leaving the RRC connected state, or entering an inactive or suspend state.

Solution 2

The base station may send a message (e.g., SI, RRCConnectionRelease, RRCEarlyDataComplete, etc.) to instruct the UE to enter the RRC idle state. The message may also include coverage hole information. When the UE determines that it enters a coverage hole, the UE can start timer 1. The duration of timer 1 may be set to the coverage hole duration, or the expiry of timer 1 may be determined by the coverage end time.

After receiving the message, the UE first performs the operation of leaving the RRC connected state, or entering an idle state, and then performs the operation for handling coverage hole. Specifically, the UE may start timer 1, and suspend other running timers. The UE may further stop or relax cell search or PLMN search. The UE may also stop or relax downlink signal monitoring and measurement, and either stop or postpone the initiation of services. Until the timer 1 expires, or the UE leaves the coverage hole, the UE resumes other timers, starts cell search or PLMN search, and may also initiate services if needed.

Alternatively, after receiving the message, the UE first performs the operation for handling coverage hole, which is similar as described above and including staring timer 1. Until the timer 1 expires, or the UE leaves the coverage hole, the UE resumes other timers, performs the operation of leaving the RRC connected state, or entering an idle state.

Embodiment 3

The base station may send an RRC message (e.g., RRCConnectionRelease, RRCEarlyDataComplete, etc.) to the UE to instruct the UE to enter an idle state, a suspend state, or an RRC inactive state. At the same time, in order to help the UE select other cells, the base station may carry some cell selection assistance information in the RRC message (e.g., redirectedCarrierInfo, redirectedCarrierOffsetDedicated, altFreqPriorities, idleModeMobilityControlInfo, etc.). The cell selection assistance information may include frequency information or cell information and may be indicative of potential neighboring cells, and may further include cell selection priority information. However, the UE may be moving and may move out of the potential neighboring cells configured by the base station. Therefore, the cell selection assistance information is time-sensitive and may have a validity period. When the cell selection assistance information expires, the neighbor information may need to be discarded.

For the UE, after receiving the RRC message, it may enter the idle state, the RRC idle with suspended RRC connection, or the inactive state. If the RRC message carries cell selection assistance information, the UE may start a timer (e.g., T320 timer, T322 timer, T323 timer). During the running of the timer, the UE will try to select these cells. When the timer expires, the UE discards the cell selection assistance information and applies the neighbor cell information sent in the system information.

In the coverage hole scenario, the base station may help the UE to quickly select the cell by indicating the cell selection assistance information including neighboring cell information which may be applied by the UE after the coverage hole. However, when the UE enters a coverage hole, if the UE performs cell reselection, as the cell reselection may continuously fail in the coverage hole, a timer associated with the cell selection assistance information may eventually time out, which leads to the cell selection assistance information to be expired. In this embodiment, various solutions are described.

Solution 1

In this solution, the validity of the cell selection assistance information may be extended by pausing and resuming the timer.

The base station may send to the UE a message carrying the cell selection assistance information, along with an associated timer 1 (including a duration of the timer 1). The message may further include at least one of:

an indication for enabling the UE to extend the timer that is associated with the cell selection assistance information;

an indication for enabling the UE to pause and resume the timer 1;

a pause time for pausing the timer 1;

a resuming time for resuming the timer 1; or a pausing duration of the timer 1.

After receiving the message, the UE leaves the RRC connected state or enters the RRC idle with suspended RRC connection or the RRC inactive state. When the message carries cell selection assistance information, and the duration of the associated timer 1, the UE starts the timer 1. If the UE determines that it is about to enter or enters a coverage hole, the UE pauses the timers 1, save the cell selection assistance information, and stop cell searches. If the UE determines that the coverage hole ends, the UE resumes the timer 1 and continues the cell search based on the cell selection assistance information.

In this solution, the timer 1 is paused and resumed, to extend the validity period of the cell selection assistance information.

Solution 2

In this solution, the duration of the timer 1 as described above is extended to extend the validity period of the cell selection assistance information.

The base station may send to the UE a message carrying the cell selection assistance information, along with an associated timer 1 (including a duration of the timer 1). The message may further include at least one of:

an indication for enabling the UE to extend the timer 1; or an extension time for timer 1.

After the UE receives the message, the UE leaves the RRC connected state or enters the RRC idle with suspended RRC connection or the RRC inactive state. When the message carries cell selection assistance information and the duration of the associated timer 1, the UE starts the timer 1. If the UE determines that it is about to enter or enters a coverage hole, the UE extends the timers 1 according to the extension time, that is, the extension time is added to the duration of the timer 1.

Embodiment 4

When the UE is in connected state, it is possible that the base station needs to release the UE based on certain consideration. For example, the base station may predict that the UE may lose cell coverage due to a coverage hole. Therefore, the base station may attempt to release the UE. However, the release attempt may fail due to various reasons, such as the release message may fail to be delivered to the UE. This causes a situation that the UE loses cell coverage yet is still in connected state. In this situation, the UE detects that the signal quality deteriorates, which in turn triggers a radio link failure. Subsequently, the UE initiates an RRC re-establishment procedure. During the RRC re-establishment procedure, the UE may start the timer T311 and perform the cell search procedure during the running of the timer T311. If the UE still does not find a suitable cell after the timer T311 expires, the UE will enter the idle state. If the UE finds a suitable cell before the timer T311 expires, the UE will send an RRC re-establishment message in the new cell to initiate a random access procedure.

However, if the UE enters a coverage hole, then the UE may not be able to find a suitable cell before the timer expires, and the RRC re-establishment fails. In order to improve the success rate of RRC re-establishment, various solutions are disclosed in this disclosure.

Solution 1

In this solution, before triggering the RRC re-establishment procedure, the UE enters the coverage hole (or silent period, or access barring period).

After the UE detects the radio link failure and before triggering the RRC re-establishment procedure, if the UE determines that it enters or is about to enter a coverage hole, the UE delays triggering the RRC re-establishment procedure. To handle the coverage hole, the UE may start a timer 1, and sets the duration of timer 1 to the coverage hole duration. During the running time of the timer 1, the UE is in a silent (or mute) state or cell access barring state. In this state, the UE saves the UE context and may either stop or relax cell search and/or PLMN search. The UE may also stop or relax signal measurement. Once the timer 1 expires, the UE triggers the RRC re-establishment procedure.

Solution 2

In this solution, the UE enters the coverage hole after triggering the RRC re-establishment procedure.

After the UE triggers the RRC re-establishment procedure, and before starting the cell selection procedure or staring the cell selection timer (e.g., timer T311), if the UE determines that it enters or is about to enter a coverage hole, the UE starts a timer 1, and sets the duration of timer 1 to the coverage hole duration. During the running time of the timer 1, the UE is in a silent (or mute) state or cell access barring state. In this state, the UE saves the UE context and may either stop or relax cell search and/or PLMN search. The UE may also stop or relax signal measurement. Once the timer 1 expires, the UE triggers the cell reselection procedure, and may further send an RRC re-establishment message to the base station, to complete the RRC re-establishment procedure.

Solution 3

In this solution, the duration of the timer associated with cell reselection is extended. Specifically, if the UE determines that it enters or is about to enter a coverage hole, the UE may extend the duration of the timer associated with cell reselection according to the coverage hole duration. Therefore, the cell reselection period is compensated to counteract the impact from the coverage hole.

Embodiment 5

When the UE is in idle or inactive state, the UE may perform cell search (including cell selection and cell reselection) and PLMN search. When the UE is in the coverage hole, the UE may not find a cell or a PLMN. In this scenario, the UE behavior may be different compared with the UE behavior when the UE is in other existing states such as idle state or inactive state. In this disclosure, a new UE state is introduced to cover such scenario. This new UE state may be referred to as a mute state, or a silent state, or a cell access barring state.

The UE behavior in the mute state is described below:

The UE may stop or relax cell search and PLMN search;

The UE may stop or relax measurement;

The UE may pause timers, for example, the timers associated with the cell search, cell selection, or the like;

The UE may save its UE context; and

The UE may stop or postpone initiating service.

As described above, relaxing cell search and PLMN search may include reducing the corresponding search frequency; relaxing measurement may include reducing the corresponding measurement frequency.

In some embodiments, the base station or the core network may configure how the UE performs the cell search, the PLMN search, or the measurement. For example, the base station may configure at least one of the following parameters:

a search or measurement periodicity;

a search or measurement duration within each search period; or a maximum search or measurement time.

The UE may perform cell search and PLMN search according to the above parameters, and measure the signal.

When the maximum search duration is reached, the UE stops cell search and PLMN search.

When certain conditions are met, the UE may transition from an idle or inactive state to a mute state. These conditions may include at least one of the following:

the UE detecting a coverage hole;

a certain time moment. For example, the time moment may be based on an indication from the base station or the core network;

a network instruction; or the signal quality being below a predetermined threshold.

When certain other conditions are met, the UE may transition from a mute state to an idle or inactive state. These conditions may include at least one of the following:

the UE detecting an end of coverage hole;

a certain time moment; or the signal quality being above a predetermined threshold.

When certain other conditions are met, the UE may transition from a connected state to a mute state. For example, the base station or the core network may instruct the UE to enter the mute state.

Figure 5:
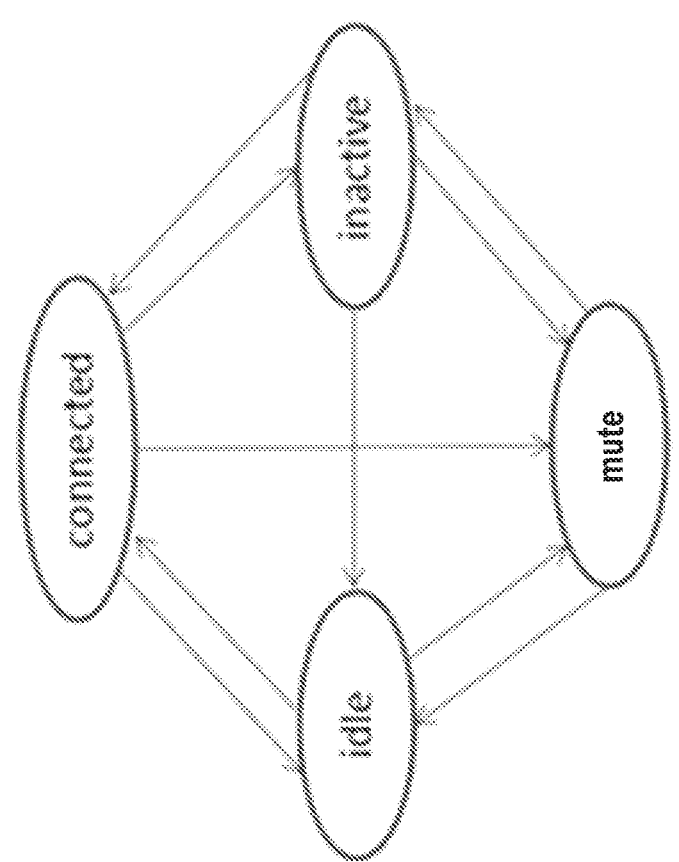
FIG. 5 shows an exemplary state transition diagram for a UE.

FIG. 5 shows an exemplary state transition diagram for a UE with the muted state introduced in this disclosure.

In this embodiment, an implementation for the UE to determine cell coverage (e.g., whether the UE is in a coverage hole) is described below.

Solution 1

The UE may determine possible coverage hole based on its search results. For example, the network (e.g., base station or core network) may indicate the UE a search periodicity P and a search duration T through system information or RRC message. The UE performs cell search and PLMN search for a duration T within each search period (P). If no cell is found or there is no available PLMN, the UE considers that it is currently in a coverage hole. In some embodiments, the RRC layer of the UE reports the search period P and the search duration T to the NAS layer of the UE, and the NAS layer instructs the AS layer to perform PLMN and cell search based on the search periodicity and the search duration in each period.

Figure 4:
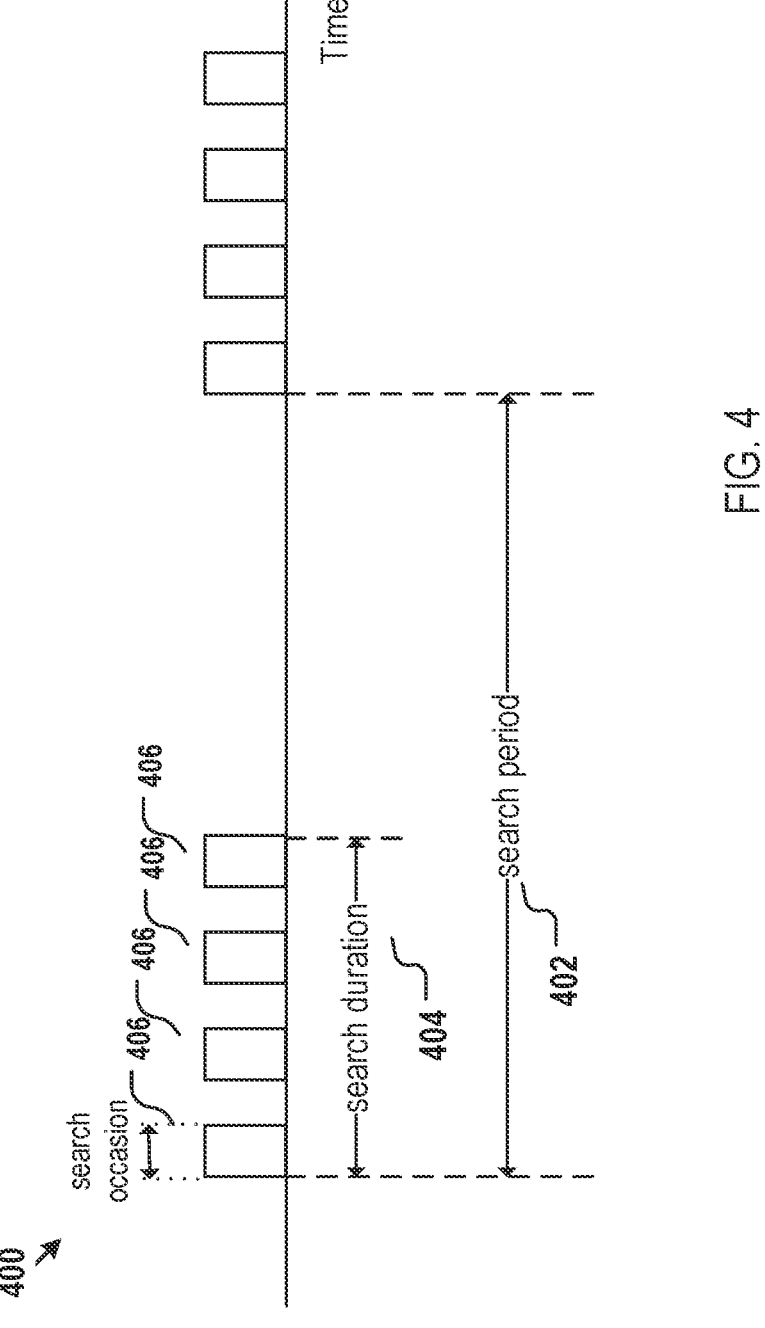
FIG. 4 shows an example UE search period, search duration, and search occasion.

Alternatively, referring to FIG. 4, to perform the cell search and the PLMN search, a search periodicity 402 may be defined. Within each search period, there is a search duration 404, and within each search duration, there may be n search occasions 406, where n is a positive integer. In some embodiments, the n search occasions may be evenly distributed in the search duration, or the n search occasions may be distributed according to a predetermined pattern. During each search occasion, the UE performs cell search and PLMN search. The network may configure the aforementioned parameters via RRC message, SI message, or NAS message.

If no cell is found, or if no PLMN is available, the UE considers that it is currently in a coverage hole.

Embodiment 6

When UE moves out of the coverage hole, the UE may perform cell (re)selection to find a cell to camp on. UE may search the cell based on the neighbor cell information indicated in system information. However, the neighbor cell information may include many neighbor cells and may be acquired before the coverage hole. The more neighbor cells the UE searches, the more energy the UE consumes. Hence, in order to assist the UE to select a new cell after the coverage hole, the base station (or the core network) may supply some assistance information to at least reduce the neighboring cells need to be searched. Various solutions for utilizing assistance information are disclosed below.

Solution 1

The base station or the core network may help the UE to quickly select the cell by sending a message to the UE carrying cell selection assistance information including neighboring cell information which may be applied after the coverage hole. The message may include an RRC message, a system information, or a NAS message. For example, the base station may instruct the UE that a particular cell to be a neighbor cell, or a candidate cell for the UE after the UE exits the coverage hole condition. The message may also carry a corresponding timer associated with the validity period of the cell selection assistance information.

After the UE receives the message, UE saves the cell selection assistance information. When the UE is in an RRC idle or an RRC inactive state, or when the UE is in an RRC re-establishment procedure or after a Radio Link Failure (RLF), if the UE determines that the coverage hole ends, the UE may start the timer associated with the cell selection assistance information, and performs cell search based on the cell selection assistance information. It is to be understood that the UE only starts the timer when it exits the coverage hole condition. If the timer expires and no suitable cell is found, the UE may continue the search based on frequency information and cell information not carried in the cell selection assistance information. For example, this may include a last visited or last camped cell of the UE, or other frequency information and cell information sent from the base station (different from the cell selection assistance information). The UE may further start cell selection or PLMN search procedure.

Solution 2

In this solution, the UE starts to use the cell selection assistance information at a certain time point.

The base station or the core network may send to the UE a message carrying the cell selection assistance information, along with an associated timer (including a duration of the timer). The message may include an RRC message, a system information, or a NAS message. The base station may further indicate to the UE a timing information in the message. The timing information may include a certain time point that the UE may start to use the cell selection assistance information to perform search, along with a search duration.

After the UE receives the message, the UE saves the cell selection assistance information and the timing information. When the UE is in the RRC idle or the RRC inactive state, or when the UE is in an RRC re-establishment procedure or after an RLF, once the certain time point is reached, the UE starts the timer associated with the cell selection assistance information, sets the duration of the timer to be the search duration, and starts cell search according to the cell selection assistance information. When the timer expires, the UE may discard the cell selection assistance information. If the UE does not find a suitable cell, the UE may continue the search based on frequency information and cell information not carried in the cell selection assistance information. For example, this may include a last visited or last camped cell of the UE, or other frequency information and cell information sent from the base station (different from the cell selection assistance information). The UE may further start cell selection or PLMN search procedure.

Solution 3

In this solution, only after meeting a signal quality condition, the UE starts to apply the cell selection assistance information.

The base station or the core network may send to the UE a message carrying the cell selection assistance information, along with an associated timer (including a duration of the timer). The message may further include a signal reception quality related condition associated with the cell selection assistance information. On the UE side, when the signal reception quality meets the signal reception quality related condition, the UE starts the cell search based on the cell selection assistance information. The signal reception quality related condition may include a signal quality threshold.

Specifically, after the UE receives the message, the UE saves the cell selection assistance information. When the UE is in the RRC idle or the RRC inactive state, or when the UE is in an RRC re-establishment procedure or after an RLF, the UE monitors signal reception quality for signal of a serving cell of the UE, or signal of neighboring cell(s) of the UE, or both. Once the signal reception quality is below the signal quality threshold, the UE starts the timer associated with the cell selection assistance information. When the timer expires, the UE may discard the cell selection assistance information. If the UE does not find a suitable cell, the UE may continue the search based on frequency information and cell information not carried in the cell selection assistance information. For example, this may include a last visited or last camped cell of the UE, or other frequency information and cell information sent from the base station (different from the cell selection assistance information). The UE may further start cell selection or PLMN search procedure.

Embodiment 7

When the UE is in an idle or an inactive state, the UE camps on a cell, obtains the paging occasion configuration of the cell, and determines the paging occasion (PO) according to its UE ID. In each Discontinuous Reception (DRX) cycle, the UE monitors the paging message at its own paging occasion. On the core network side, if there is a paging message for the UE, the core network sends the paging message in the tracking area where the UE is located. On the base station side, if the paging message of the UE arrives, the base station sends the paging message of the UE at the paging occasion associated with the UE.

In the coverage hole scenario, the UE may be in a coverage hole (or, in a silent/mute state, or an access barring state), and is not able to receive data. If the core network or base station does not know the status of the UE, when a paging message arrives, the core network or base station still attempts to page the UE, but no response from the UE may be received, resulting in a call failure. Or, in a coverage hole scenario, the UE may be in a mute state, or the UE may be barred from accessing the network, so the UE is not able to receive data. When the UE leaves the coverage hole, the UE may need to wait until the next DRX cycle or the next extended DRX (eDRX) cycle to receive the paging message, which may lead to a delay to the paging message reception. Additionally, the UE may support a Power Saving Mode (PSM) function. When the UE wakes up in the PSM mode, the UE initiates a Tracking Area Update (TAU) procedure to perform cell search. However, the UE may wake up when the UE is in a coverage hole or when the UE is barred from accessing the network, the cell search fails and wastes the UE's energy. As such, it may be beneficial for the UE to take some proactive actions when there is a coverage hole.

In this disclosure, various embodiments are disclosed to coordinate UE's DRX/eDRX/PSM behavior when the UE is in a coverage hole.

Solution 1

The UE renegotiates eDRX/PSM parameters with the core network.

When the UE determines that the eDRX paging time window (PTW) or the PSM activation time of the UE conflicts with the coverage hole, the UE may negotiate eDRX/PSM parameters with the core network. The UE may send a message, such as an attach request message, a TAU request message, etc., to the core network. The message may include a NAS message. The message may carry at least one of:

- a desired extended Discontinuous Reception (eDRX) parameter;
- a desired shift time of a Paging Time Window in an eDRX cycle;
- a desired Power Saving Mode (PSM) parameter;
- a desired shift time of an activation time of a PSM;
- a coverage hole information;
- an eDRX deactivation indication;
- a PSM deactivation indication;
- a periodicity of the coverage hole;
- a start time of a next coverage hole; or
- a ratio between a duration of the coverage hole in a predetermined total duration and the predetermined total duration.

The core network may send a response message to the UE, such as an attach completion messages, a TAU completion messages, etc. The response message may carry negotiated eDRX/PSM parameters. The eDRX parameters may include: eDRX cycle, PTW length, PTW start time, eDRX activation and deactivation indication, etc. The PSM parameters may include: the length of the activation time, the start time of the activation time, the indication for activation or deactivation of PSM, etc.

Solution 2

The UE requests a deactivation of the eDRX or PSM function.

Similar to solution 1, the UE may send a message to the core network. The message may include at least one of an eDRX deactivation indication or a PSM deactivation indication. The core network may send a response message to the UE with an indication whether the deactivation is granted. The response message may further carry negotiated eDRX/PSM parameters.

Solution 3

The UE shifts the start time of the paging time window.

When the UE determines that the PTW in the eDRX of the UE conflicts with the coverage hole, the UE may shift forward/backward the start time of the PTW. For example, the start time of the PTW obtained by the UE according to the UE ID is T, and after shifting forward, it becomes T+t; or after shifting backward, it becomes T-t, where t is the offset. The offset may be determined by the coverage loophole information. After the shift, the PTW no longer conflicts with the coverage hole.

Solution 4

The UE shifts the wake-up time of the PSM.

When the UE determines that the wake-up time of the PSM of the UE conflicts with the coverage hole, the UE may shift forward/backward the wake-up time of the PSM. For example, the start time of the wake-up time of the UE's PSM is T, after shifting forward, it becomes T+t; or after shifting backward, it becomes T-t, where t is the offset. The offset may be determined by the coverage loophole information. After the shift, the wake-up time of the UE's PSM no longer conflicts with the coverage hole.

Solution 5

After the UE camps on a new cell, the UE update the core network with its location.

After the UE leaves the coverage hole, it may camp on a new cell. The UE may report its current location to the core network via an NAS message. For example, the UE may initiate a TAU procedure, which may carry a tracking area identification, the identification of the new cell, the identification of the last camped/visited cell, etc. The core network then knows the current location of the UE upon receiving the NAS message. The core network may further sends a response message to the UE, such as an attach completion messages, a TAU completion messages, etc. The response message may carry negotiated/updated eDRX/PSM parameters.

Solution 6

In one scenario, the coverage hole condition may be periodic. For example, due to the coverage pattern of serving satellites. In another scenario, during a given period, the duration of coverage hole condition may exceeds a predefined threshold. For example, the UE stays in coverage hole for more than 5 minutes with an hour. In these scenarios, the UE may notify the characteristics of the coverage hole to the core network via NAS message such as an attach request message, a TAU request message, etc. The characteristics of the coverage hole include at least one of:

a periodicity of the coverage hole;

an interval between each coverage hole;

the start time of the next coverage hole; or a ratio between the duration of coverage hole condition in a predefined period and the predefined period.

The core network may further sends a response message to the UE, such as an attach completion messages, a TAU completion messages, etc. The response message may carry negotiated/updated eDRX/PSM parameters.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method performed by a User Equipment (UE) in a wireless network, the method comprising:

receiving, from a network element in the wireless network, a system information message comprising cell coverage information associated with a search limitation of the UE, wherein the cell coverage information comprises one or more of an end time of the search limitation or a service start time of a next serving cell or a next serving satellite of the UE, and wherein the search limitation comprises at least one of:

pausing or relaxing a cell search or a PLMN search;

stopping or relaxing a predetermined operation;

pausing or relaxing a signal measurement; or limiting access to the wireless network; and determining the cell coverage information based on the system information message.

2. The method of claim 1, wherein the cell coverage information further comprises at least one of:

a duration of the search limitation;

a start time of the search limitation;

whether a search limitation is present;

a service end time of a current serving cell or a current serving satellite of the UE; or a search limitation periodicity.

3. The method of claim 2, wherein the network element comprises one of a base station or a core network element.

4. The method of claim 1, wherein determining the cell coverage information comprises:

determining the cell coverage information according to a signal reception quality of the UE.

5. The method of claim 4, wherein the signal reception quality comprises at least one of:

a signal reception quality from a serving cell of the UE; or a signal reception quality from a neighboring cell of the UE.

6. The method of claim 4, wherein determining the cell coverage information according to the signal reception quality comprises:

determining whether the signal reception quality being below a first quality threshold for a predetermined duration; and in response to the signal reception quality being below the first quality threshold for the predetermined duration, determining the search limitation is present.

7. The method of claim 6, wherein before determining whether the signal reception quality being below the first quality threshold for the predetermined duration, the method further comprises:

receiving, from a base station of the wireless network, a message comprising at least one of the first quality threshold or the predetermined duration.

8. The method of claim 1, further comprising:

receiving, from a base station of the wireless network, a message instructing the UE to transition to one of the following state: a suspend state, an inactive state, or an idle state.

9. The method of claim 8, further comprising:

starting a sleep timer with a duration equal to a duration of the search limitation.

10. The method of claim 9, wherein before starting the sleep timer, the method further comprises:

transitioning to one of the following state: the suspend state, the inactive state, or the idle state.

11. The method of claim 10, further comprising:

storing a context of the UE and suspending at least one of a Signaling Radio Bearer (SRB) or a Data Radio Bearer (DRB) of the UE;

pausing at least one timer other than the sleep timer;

pausing or relaxing a cell search or a PLMN search; and pausing or relaxing a signal measurement.

12. The method of claim 9, further comprising:

in response to the sleep timer expiring, resuming at least one timer other than the sleep timer and starting a cell search or a PLMN search.

13. The method of claim 12, wherein after in response to the sleep timer expiring, resuming the at least one timer other than the sleep timer and starting the cell search or the PLMN search, the method further comprises:

transitioning to one of the following state: the suspend state, the inactive state, or the idle state.

14. The method of claim 1, further comprising:

detecting a radio link failure;

determining whether the search limitation is presenting according to the cell coverage information; and in response to the search limitation being presenting, performing a search limitation handling operation.

15. The method of claim 14, wherein performing the search limitation handling operation comprises at least one of:

starting a timer with a duration being equal to a duration of the search limitation;

pausing or relaxing a cell search or a PLMN search;

pausing or relaxing a signal measurement; or extending a cell reselection timer according to the duration of the search limitation.

16. The method of claim 15, wherein after performing the search limitation handling operation, the method further comprises:

in response to the timer expiring, triggering an RRC reestablishment procedure.

17. The method of claim 15, wherein:

before determining whether the search limitation is presenting according to the cell coverage information, the method further comprising:

initiating an RRC reestablishment procedure; and after performing the search limitation handling operation, the method further comprises:

in response to the timer expiring, resuming the RRC reestablishment procedure.

18. The method of claim 1, further comprising:

determining that the search limitation is not presenting based on the cell coverage information;

performing a cell search or a PLMN search; and receiving, from a base station in the wireless network, a message comprising cell selection assistance information.

19. A User Equipment (UE) comprising a memory for storing computer instructions and a processor in communication with the memory, wherein, when the processor executes the computer instructions, the processor is configured to cause the UE to:

receive, from a network element in a wireless network, a system information message comprising cell coverage information associated with a search limitation of a wireless network of the UE, wherein the cell coverage information comprises one or more of an end time of the search limitation or a service start time of a next serving cell or a next serving satellite of the UE, and wherein the search limitation comprises at least one of:

pausing or relaxing a cell search or a PLMN search;

stopping or relaxing a predetermined operation;

pausing or relaxing a signal measurement; or limiting access to the wireless network; and determining the cell coverage information based on the system information message.

20. A non-transitory storage medium for storing computer readable instructions, the computer readable instructions, when executed by a processor in a User Equipment (UE), causing the processor to:

receive, from a network element in a wireless network, a system information message comprising cell coverage information associated with a search limitation of the wireless network of the UE, wherein the cell coverage information comprises one or more of an end time of the search limitation or a service start time of a next serving cell or a next serving satellite of the UE, and wherein the search limitation comprises at least one of:

pausing or relaxing a cell search or a PLMN search;

stopping or relaxing a predetermined operation;

pausing or relaxing a signal measurement; or limiting access to the wireless network; and determining the cell coverage information based on the system information message.

* * * * *